United States Patent [19]

Pratt et al.

[11] Patent Number: 5,113,312
[45] Date of Patent: May 12, 1992

[54] ELECTRIC POWER DISTRIBUTION PANELBOARD-SWITCHBOARD BUS BAR INSULATION SHIELD

[75] Inventors: James R. Pratt, Wolcott; Dean A. Robarge, New Britain; Robert G. Markowski, East Haven; Denis A. Perzan, Plainville; John A. Morby, Farmington, all of Conn.

[73] Assignee: General Electric Company, New York, N.Y.

[21] Appl. No.: 673,702

[22] Filed: Mar. 22, 1991

[51] Int. Cl.⁵ .............................................. H02B 1/20
[52] U.S. Cl. ..................................... 361/361; 361/341; 361/346; 361/355
[58] Field of Search ............... 361/341, 342, 353, 355, 361/356, 357, 361, 376

[56] References Cited

U.S. PATENT DOCUMENTS

| | | | |
|---|---|---|---|
| 4,242,718 | 12/1980 | Shariff et al. | 361/341 |
| 4,301,493 | 11/1981 | Schweikle et al. | 361/355 |
| 4,374,405 | 2/1983 | Olashaw et al. | 361/355 |
| 4,744,003 | 5/1988 | Koslosky et al. | 361/363 |
| 4,754,247 | 6/1988 | Raymont et al. | 335/202 |
| 4,945,450 | 7/1990 | Sabatella et al. | 361/334 |
| 5,067,043 | 11/1991 | Markowski et al. | 361/361 |

FOREIGN PATENT DOCUMENTS 0121943  9/1979  Japan ................................ 361/345

OTHER PUBLICATIONS

Ser. No. 388,452 entitled "Electric Power Distribution Panelboard-Switchboard Assembly", filed 8/2/89, Morby et al.
Ser. No. 627,147 entitled "Electric Power Distribution Panelboard-Switchboard Bus Bar Insulation Shield", filed 12/13/90, Markowski et al.

Primary Examiner—Gregory D. Thompson
Attorney, Agent, or Firm—Richard A. Menelly; Fred Jacob

[57] ABSTRACT

A combination panelboard-switchboard housing accepts plug-on connection with a plurality of electric switch-circuit breaker modules. Circuit breakers can also be directly connected onto the bus bars in a plug-on connection with minor modification. The bus bars are "edge-mounted" such that the minor dimension of the bus bars is perpendicular to the bottom of the housing to receive the modules as well as the circuit breakers, per se. Electrical insulation shields are arranged over those bus bars that are not connected with the circuit breakers or modules to prevent inadvertent contact with the bus bars when energized. The tabs extending from the edge of the insulation shields are keyed to accommodate for the different widths of the modules when the insulation shields are flush-mounted against one side of the modules.

11 Claims, 4 Drawing Sheets

ELECTRIC POWER DISTRIBUTION PANELBOARD-SWITCHBOARD BUS BAR INSULATION SHIELD

BACKGROUND OF THE INVENTION

Electric power distribution panelboards and switchboards are currently available which accept circuit breakers and electric switches by means of a plug-on connection to the bus bars arranged therein. U.S. Pat. No. 4,744,003 describes one such panelboard arrangement. When electric switches or circuit breakers are to be installed on-site within such an operating panelboard or switchboard, the electric power must be temporarily discontinued and the panelboard or switchboard disassembled before such electric switch or circuit breaker can be installed. Since the switchboard and panelboard equipment accept the same-sized circuit breakers and electric switches, the "electrical enclosure" as used herein includes both panelboard and switchboard enclosures. Where modifications must be made to the electrical enclosure interior in order to install the electric switches or circuit breakers, some time is required before the power can be turned ON. This disruption in electric power within an industrial environment could cause scheduling problems both with respect to the related equipment as well as to operating personnel.

U.S. patent application Ser. No. 388,452, filed Aug. 2, 1989, entitled "Electric Power Distribution Panelboard-Switchboard Assembly", describes one such assembly which can accept circuit breakers and electric switches by means of a modular enclosure without requiring that the electrical enclosure be electrically de-energized.

With some electrical enclosures, it is often convenient to plug the electric switch or circuit breaker directly onto the edge-mounted electric bus bars with minor modification in which case the electrical enclosure must be de-energized to prevent damage to the equipment as well as to personnel. To deter electrical circuit with the bus bars in the event that the electrical enclosure becomes inadvertently energized, some means should be employed to prevent direct access at all times to those bus bars that are not connected with the modules, electric switches or circuit breakers.

U.S. Pat. No. 4,754,247, entitled "Molded Case Circuit Breaker Accessory Enclosure", describes a circuit breaker having an electronic trip unit and accessory devices mounted within the circuit breaker cover. The accessory devices are accessed by means of an accessory cover without affecting the integrity of the circuit breaker case which contains the circuit breaker operating components such as the operating mechanism, contacts and arc chute. A wire conductor access slot formed within the circuit breaker case allows for the egress of the wire conductors leading to the accessories while an arc vent slot formed within the circuit breaker case adjacent the arc chute provides supplemental gas venting to the arc gases that are generated during intense circuit interruption. When such side-vented circuit breakers are used within electrical enclosures containing edge-mounted bus bars, the bus bars should be shielded from direct contact with the arc gas by-products that accompany the arc gas evolution from the arc vent slots.

U.S. patent application Ser. No. 627,147 filed Dec. 13, 1990 entitled "Electric Power Distribution Panelboard-Switchboard Bus Bar Insulation Shield" describes a plastic or fiber insulation shield that is arranged over the energized bus bars. However, field modification must be made to the insulation shield to allow for flush-mounting of the shield to the electric switch-circuit breaker modules when the electric switch and circuit breakers are of increased size.

Accordingly, one purpose of this invention is to provide convenient and inexpensive adjustable bus bar insulation shields that can be installed either at the factory or on-site.

SUMMARY OF THE INVENTION

The invention comprises adjustable electric insulation shields for use within panelboard and switchboard housings containing a plurality of edge-mounted power bus bars. The housings accept a plurality of electric switches, circuit breakers and modules containing such electric switches and circuit breakers. A plurality of flexible plastic or fiber electric insulation shields are positioned over the bus bars to prevent inadvertent contact with the energized bus bars as well as to shield the bus bars from the gaseous by-products issuing from the circuit breakers during intense circuit interruption. The insulation shields are keyed to accommodate variations in the width of the modules that carry the electric switches and circuit breakers.

DESCRIPTION OF THE PREFERRED EMBODIMENT

For purposes of this disclosure, a switchboard is defined as "a self-standing array of circuit interruption devices rated up to a particular ampere value". A panelboard is defined as "a wall-mounted device that includes an array of circuit interruption devices up to a rating less than that of a switchboard". A switchboard can comprise a plurality of individual panelboards mounted within a common self-standing enclosure.

Figure 1:
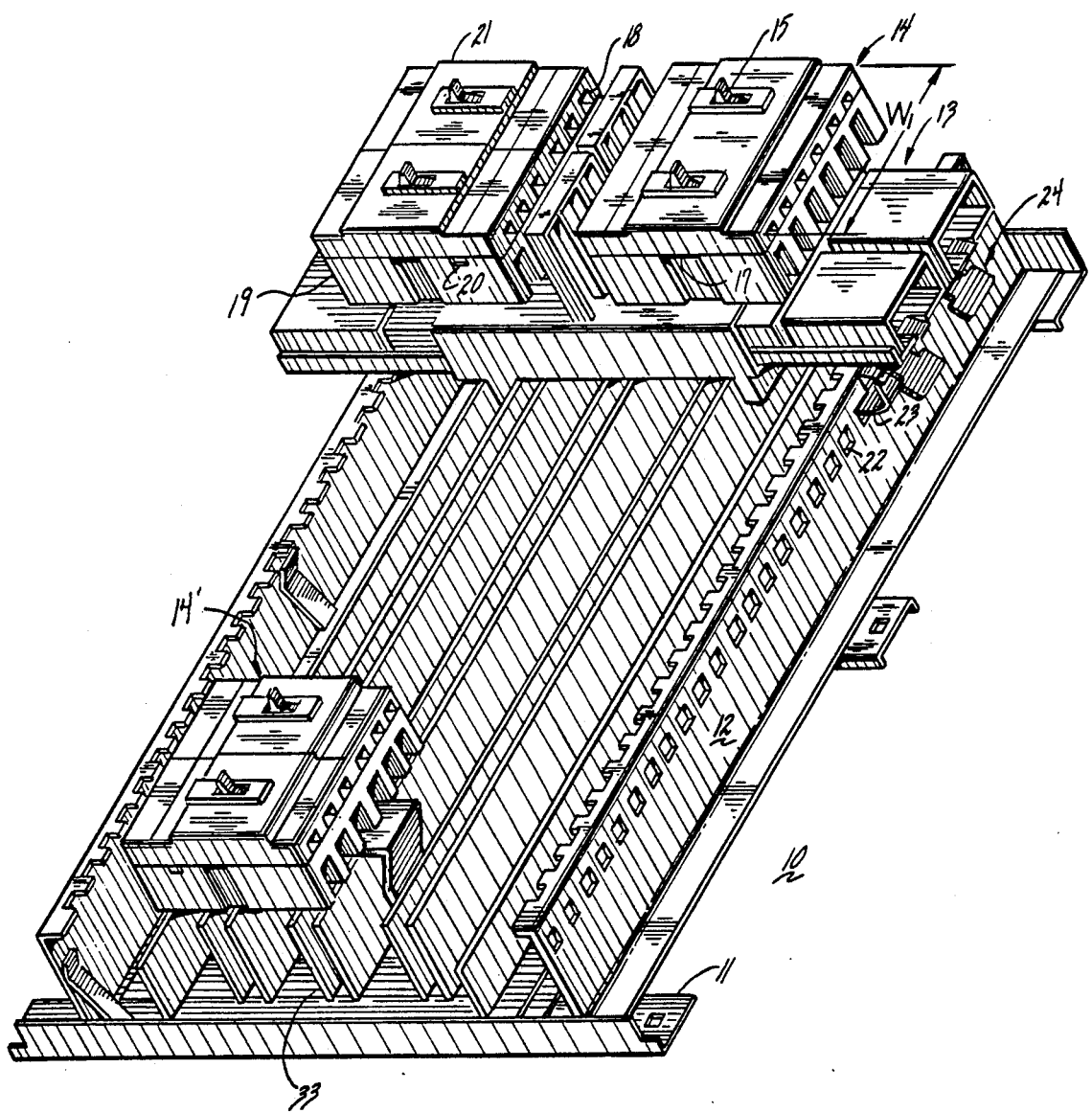
FIG. 1 is a top perspective view of the interior of an electrical enclosure according to the prior art.

The panelboard or switchboard interior 10 of FIG. 1 accepts a wide range of circuit interruption devices which are attached to the interior by means of an electric switch-circuit breaker module 13 (hereafter "module") such as described within the aforementioned U.S. patent application Ser. No. 388,452. The module can contain a pair of electric switches (not shown) or a pair of circuit breakers, as indicated at 14 and 14'. The circuit breakers are electrically connected with the edge-mounted bus bars 33 upon attachment of the module 13 with the Z-shaped side rails 12 upstanding on opposite sides of the interior supports 11. The circuit breakers are turned from their ON and OFF conditions by means of the externally accessible operating handles 15 which extend through the circuit breaker cover 21. As described within the aforementioned U.S. Pat. No.

4,945,450, the arc gases generated during overcurrent circuit interruption vent through the exhaust gas openings 18 arranged on the line side of the circuit breaker case 19. An additional side vent 20 is also arranged through the circuit breaker case to provide additional arc gas release when the circuit is interrupted under severe overcurrent conditions. The wiring channels 17 formed within the circuit breaker case carry the electrical conductors (not shown) that are used to electrically connect with the accessories contained within the circuit breaker cover. When modified, as described earlier, the circuit breakers and electric switches can be directly plugged onto the edge-mounted bus bars 33 as illustrated by the directly-connected circuit breakers 14'. A plurality of rectangular slots 22 are formed within the Z-shaped side rails 12 to receive the hooked ends 23 of the attachment clamps 24 arranged on the opposite ends of the module 13. Since electric switches and circuit breakers of different ampere ratings are used with the modules 13 the modules are made in a variety of widths W to accommodate the corresponding different-sized electric switches and circuit breakers.

Figure 2:
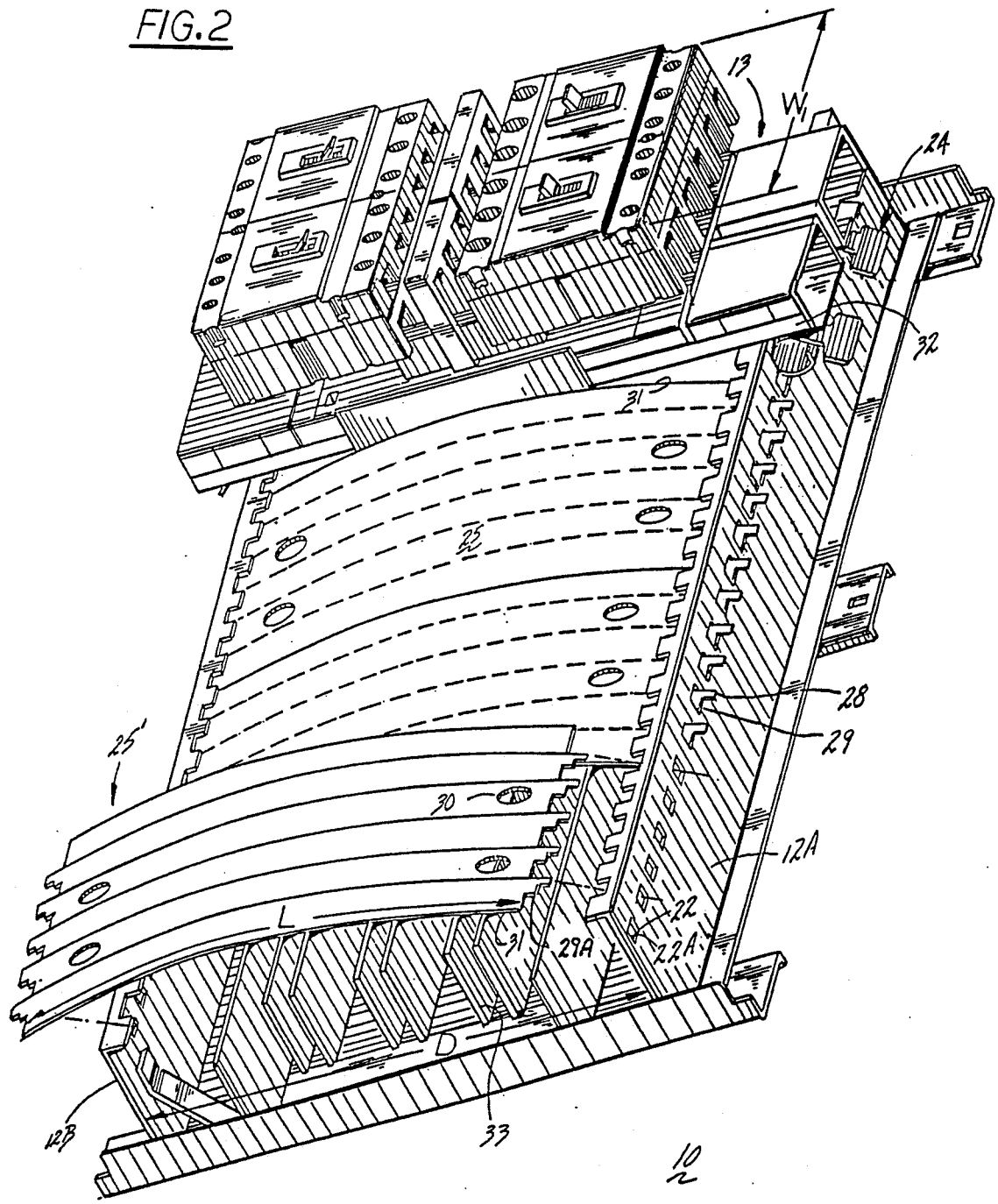
FIG. 2 is a top perspective view of the interior of the electrical enclosure of FIG. 1 depicting the bus bar insulation shields according to the invention.

In accordance with the invention, a plurality of flexible bus bar insulation shields 25 are shown in FIG. 2 attached to the interior 10. The shields are arranged over the edge-mounted bus bars 33 by grasping the apertures 30 formed at opposing ends of the shield and positioning the long and short tabs 28, 29 extending from the opposite ends of the shield within the rectangular slots 22 formed within the opposing Z-shaped side rails 12A, 12B. The shields are in the form of a rectangular sheet of a flexible fiber or plastic insulating material. The arcuate configuration of one such attached shield is depicted at 25', where the arc-shaped configuration gives over-surface clearance to the edge-mounted bus bars 33 and thereby prevents the shield from contacting the bus bars directly as will be discussed below in greater detail. It is noted that the long and short tabs 28, 29 on the ends of the insulating shields share the same rectangular slots 22 that receive the hooked ends of the attachment clamps 24 described earlier with reference to FIG. 1. This multi-functional use of the rectangular slots 22 insures the operator that either the attachment clamps or the insulating shield tabs will be within the slots and provides a safety check that all the rectangular slots are occupied to insure that the interior 10 is in a safe operating condition. It is further noted that the tabs on adjoining insulating shields can share the same rectangular shaped slots to overlap one another for additional safety. The use of the long and short tabs 28, 29 allows for different widths of the module such that for the short width $W_1$ indicated in FIG. 2 the edge 29A of the short tab engages the side 22A of the slot 22. This allows the side 31 of the adjacent insulation shield 25 to butt against the side 32 of the module 13 to deter inadvertent electric circuit with the bus bars 33 arranged under the insulation shield.

Figure 3:
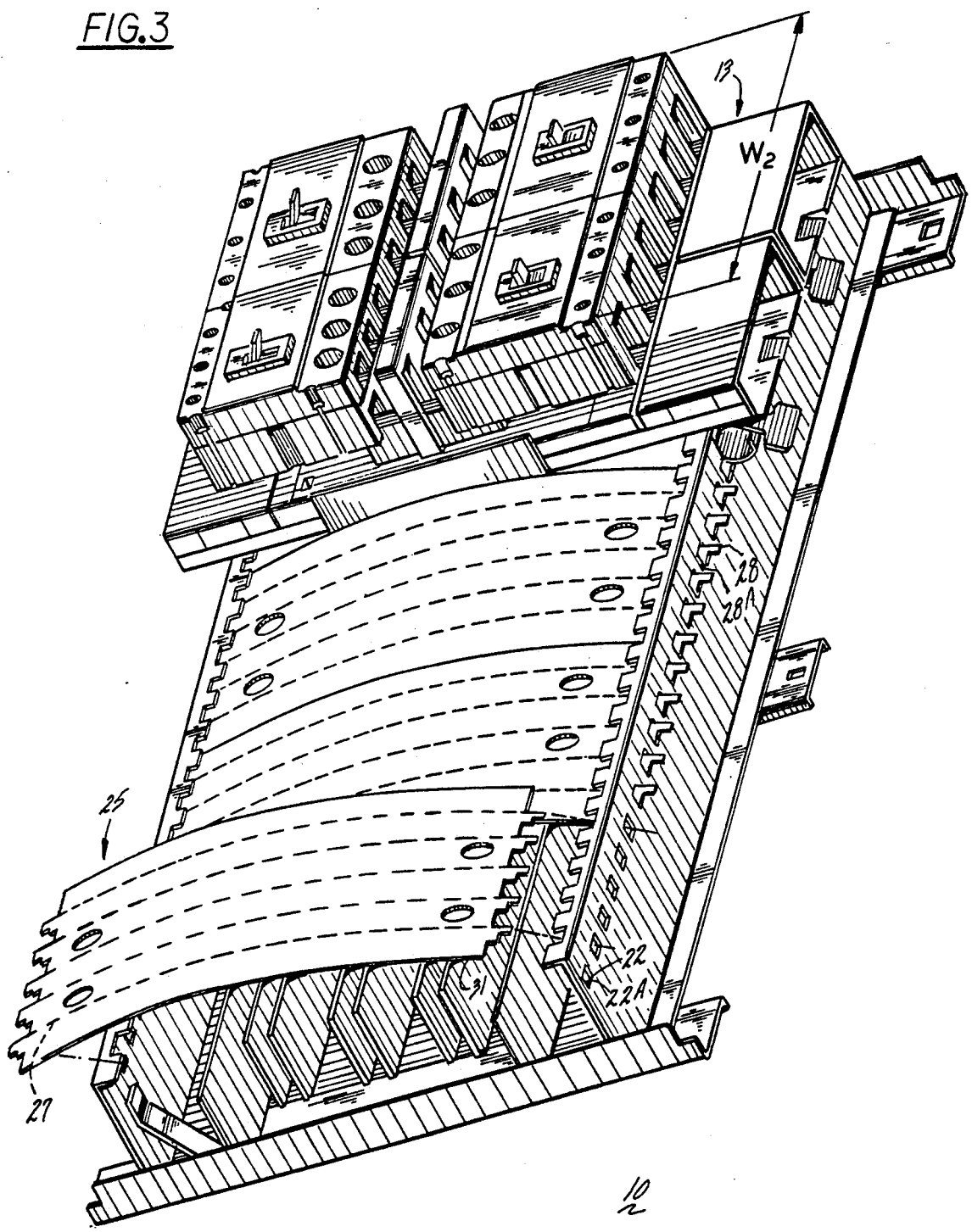
FIG. 3 is a top perspective view of the electrical enclosure interior of FIG. 1 depicting an alternate arrangement of the insulation shields of the invention.

The interior 10 of FIG. 3 includes a module 13 having a large width $W_2$ such that the long tabs 28 of the insulation shield 25 are arranged within the rectangular slots 22 and the edge 28A of the long tabs abut against the edges 22A of the rectangular slots. As indicated at 27, a plurality of six lines coextensive with the sides 31 are formed having a reduced thickness to allow the width of the insulation shields to be reduced to further accommodate any width of the modules 13 and any number of electric switches and circuit breakers to be used within the interior. The use of six lines of reduced thickness allows the insulation shields to be broken away into any of six possible widths.

Figure 4:
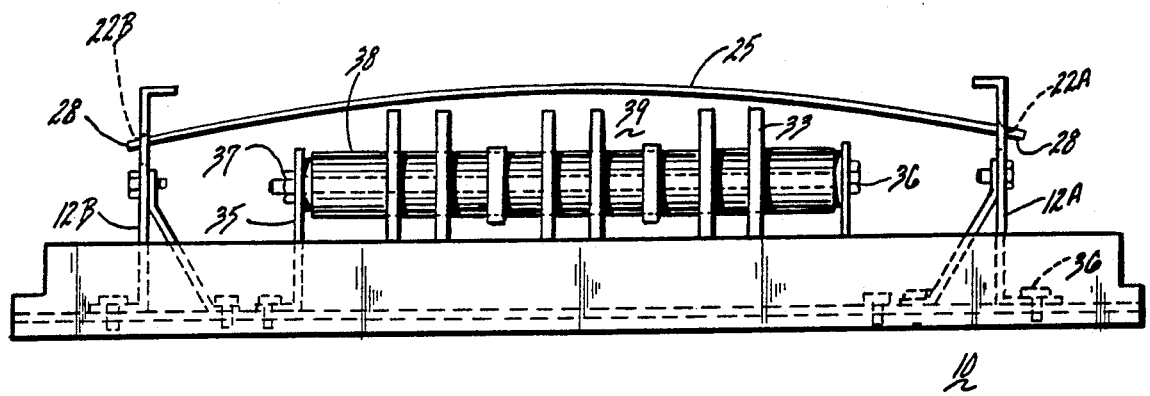
FIG. 4 is an enlarged end view of the electrical enclosure interior of FIG. 2 or 3 depicting the connection between the bus bar insulation shields of the invention and the electrical enclosure interior.

The interior 10 is depicted in FIG. 4 with the circuit breakers and modules removed to detail the arcuate shape of the attached insulating shield 25 when positioned between a pair of opposing Z-shaped side rails 12A, 12B with corresponding long tabs 28 inserted within corresponding rectangular slots 22A, 22B, as illustrated. By referring concurrently to both FIGS. 2 and 4, it can be seen that the length L of the side 31 is longer than the distance D between the opposing Z-shaped side rails 12A, 12B to provide for the arcuate shape of the attached insulation shield 25. The space 39 defined between the bottom of the insulating shield 25 and the top of the edge-mounted bus bars 33 provide over-surface clearance to the adjoining bus bars for additional electrical insulation between the adjoining bus bars. As described within the aforementioned U.S. patent application Ser. No. 388,452, the edge-mounted bus bars are separated by means of tubular insulators 38 and are supported by means of an elongated threaded bolt 36 which extends between the upright support brackets 35 and is securely fastened by means of the nut 37. The upright support brackets 35 are, in turn, securely fastened to the interior by means of bolts 36, as indicated.

Flexible, electrical insulating bus bar shields have herein been described for preventing inadvertent contact with edge-mounted bus bars contained within a switchboard or panelboard interior. The insulating shields are both inserted and removed from the interior by the cooperation of the tabs extending from the bus bar shields and the rectangular slots already existing within the Z-shaped side rails attached to the switchboard or panelboard interior.

Having thus described our invention, what we claim as new and desire to secure by Letters Patent is:

1. An interior for an electric switch or circuit breaker enclosure comprising:
   a pair of support rails having a plurality of slots through said support rails;
   support means arranged on said support rails supporting a plurality of electric switches or circuit breakers having first and second widths;
   a plurality of electric bus bars extending along said support rails and arranged for connecting with electric switches or circuit breakers having first and second widths;
   an electrically insulating shield arranged over a part of said bus bars thereby preventing access to said bus bars; and
   a plurality of first and second tabs extending from opposite ends of said insulating shield, said first tabs being inserted within said slots to thereby attach said insulating shield to said support rails when said insulating shield is used with electric switches or circuit breakers of first widths and said second tabs being inserted within said slots when said insulating shield is used with electric switches or circuit breakers of second widths.

2. The interior of claim 1 wherein said first tabs are longer than said second tabs.

3. The interior of claim 1 wherein said insulating shield comprises a rectangular configuration of a predetermined length, width and thickness.

4. The interior of claim 3 including a plurality of spaced lines formed within said insulating shield, said spaced lines being of a thickness less than said predetermined thickness to thereby allow said predetermined width to be varied.

5. The interior of claim 3 wherein said support rails are separated from each other by a fixed distance, said length of said shield being longer than said fixed distance to thereby cause said insulating shield to flex when attached to said support rails.

6. The interior of claim 1 wherein said insulating shield comprises a rectangular sheet of plastic or fiber.

7. The interior of claim 1 including manual access slots formed within said insulating shield proximate said ends facilitating attachment and removal of said insulating shield.

8. The interior of claim 7 wherein said access slots are distal said bus bars to thereby prevent line-of-sight path between electric switches or circuit breakers and said bus bars.

9. The interior of claim 1 wherein said support rails comprise Z-shaped rails.

10. An electrically-insulating bus bar shield comprising:

a rectangular sheet of plastic or fiber material having a pair of opposing ends;

at least one aperture formed proximate said ends providing manual engagement means for ease in attaching and removing said rectangular sheet from support rails within a panelboard or switchboard interior; and a plurality of first and second tabs extending from said ends of said rectangular sheet, said first tabs adapted for insertion within corresponding slots formed within support rails to thereby attach said insulating shield to support rails when said rectangular sheet is used with electric switches or circuit breakers of first widths and said second tabs adapted for insertion within corresponding slots formed within support rails when said rectangular sheet is used with electric switches or circuit breakers of second widths.

11. The shield of claim 10 wherein said rectangular sheet is capable of flexing between parallel supports extending along a panelboard or switchboard interior.

* * * * *